United States Patent [19]

Setterberg, Jr.

[11] 4,288,082
[45] Sep. 8, 1981

[54] WELL SEALING SYSTEM

[75] Inventor: John R. Setterberg, Jr., Richardson, Tex.

[73] Assignee: Otis Engineering Corporation, Dallas, Tex.

[21] Appl. No.: 145,328

[22] Filed: Apr. 30, 1980

[51] Int. Cl.³ .............................................. F16J 15/28
[52] U.S. Cl. ..................................... 277/125; 166/118
[58] Field of Search ..................... 277/117, 116, 116.2, 277/116.4, 116.6, 116.8, 120, 125; 166/117.6, 118–123

[56] References Cited

U.S. PATENT DOCUMENTS

| | | | |
|---|---|---|---|
| 609,752 | 8/1898 | Angell | 277/120 |
| 1,246,957 | 11/1917 | Lindsay | 277/116.6 |
| 1,336,738 | 4/1920 | Fletcher | 166/179 |
| 1,826,967 | 10/1931 | Thomas | 277/120 |
| 1,882,230 | 10/1932 | Nixon | 277/116.4 |
| 2,315,921 | 4/1943 | Baker | 166/179 |
| 3,531,236 | 9/1970 | Braddick et al. | 166/285 |
| 4,106,565 | 8/1978 | Braddick | 166/118 |
| 4,127,168 | 11/1978 | Hanson et al. | 166/123 |
| 4,178,992 | 12/1979 | Regan et al. | 166/117.6 |

*Primary Examiner*—Robert I. Smith
*Attorney, Agent, or Firm*—Thomas R. Felger

[57] ABSTRACT

A well sealing system for blocking fluid flow through an annulus partially defined by a tubing string disposed within a casing string. A metal seal ring is compressed and radially expanded to form a primary metal to metal seal between the exterior of the tubing string and the interior of the casing string. A production well packer and packing rings are carried by the tubing string to form secondary elastomeric to metal seals between the tubing string and casing string. Backup rings are provided to control the extrusion of the metal seal ring while it is compressed and radially expanded. A protective cylinder is also provided to prevent damage to the packing rings and the metal seal ring while the tubing string is lowered through the bore of the casing string. The protective cylinder assists in setting the production packer while the metal seal ring is being compressed.

17 Claims, 12 Drawing Figures

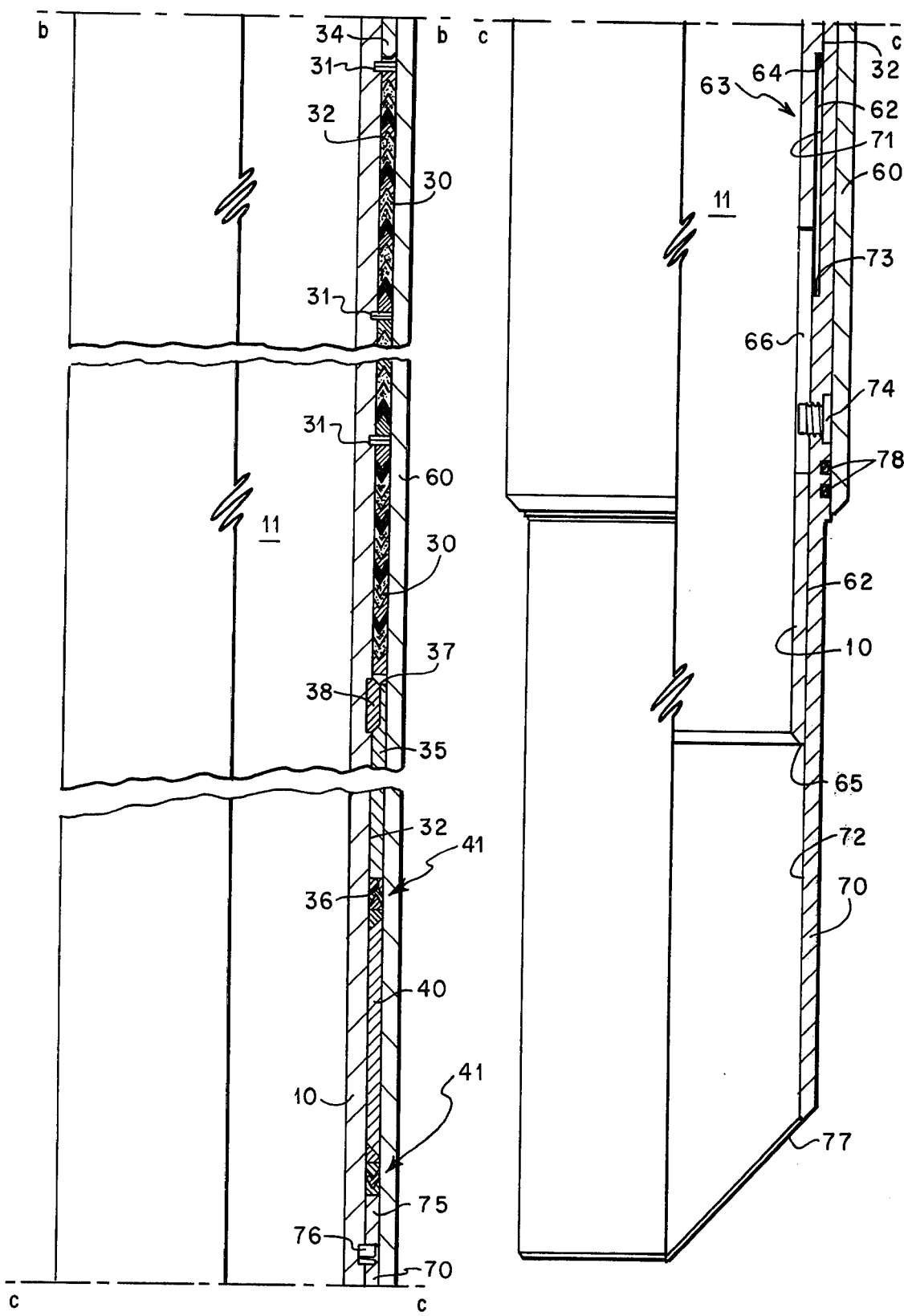

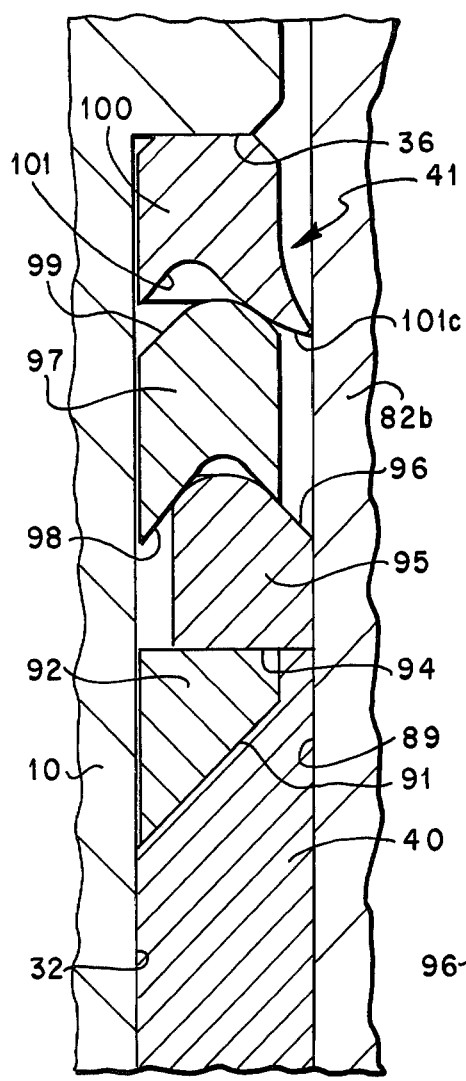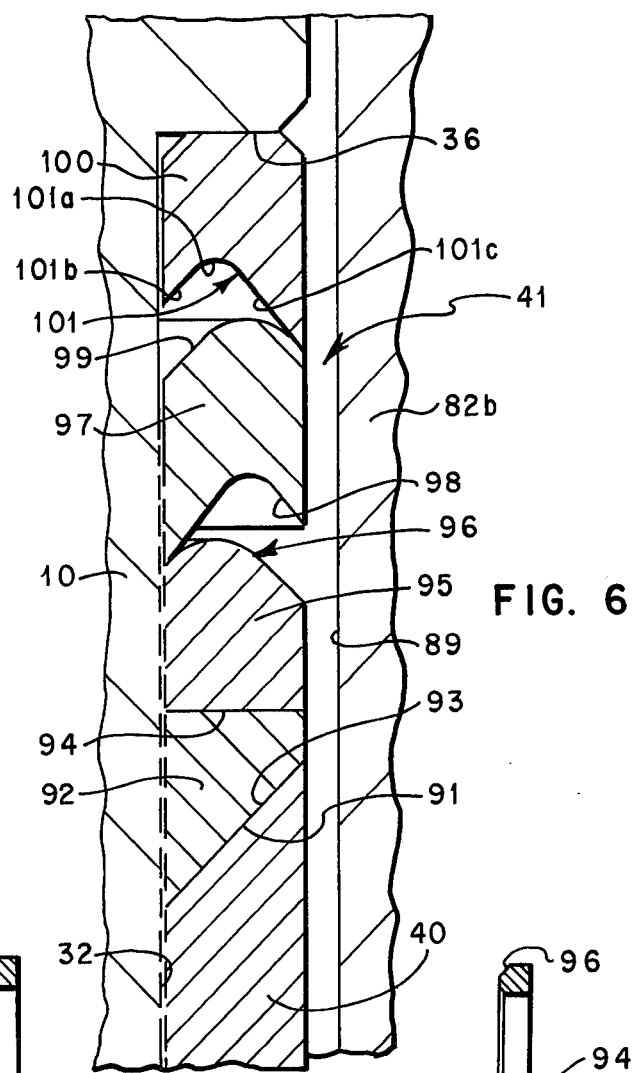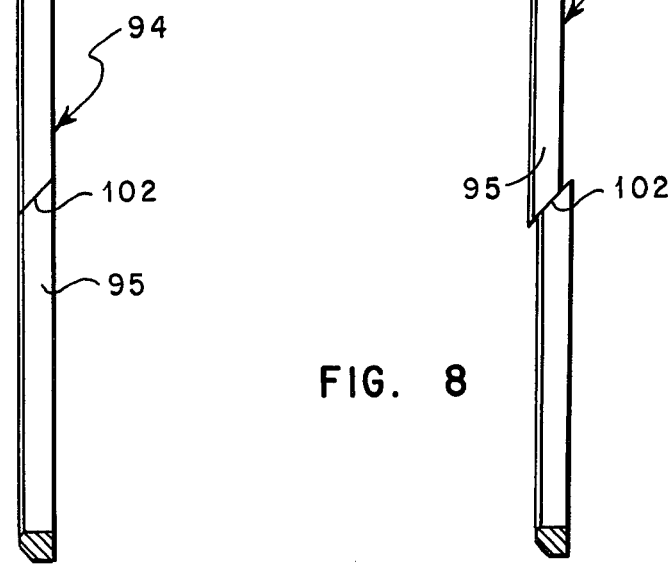
FIG. 5   FIG. 6   FIG. 7   FIG. 8

WELL SEALING SYSTEM

BACKGROUND OF THE INVENTION

1. Field of the Invention

The present invention relates to a system for forming a fluid tight seal or barrier within an annulus formed between tubular members disposed within a well bore.

2. Description of the Prior Art

U.S. Pat. No. 4,127,168 to H. R. Hanson et al. discloses a packer having a plurality of frusto-conical resilient metal seal rings for blocking fluid flow in an annular space between a tubing string and a casing string. U.S. Pat. No. 4,178,992 to L. M. Regan et al. discloses a metal seal plug for sealing or packing off the bore of a tubing string. Both U.S. Pat. Nos. 4,127,168 and 4,178,992 describe the advantages of metal to metal seals over more conventional elastomeric seals under certain conditions such as high $H_2S$ concentration or high temperature well fluids.

U.S. Pat. No. 3,531,236 to Britt O. Braddick et al. discloses a well sealing system particularly adapted for use in very deep wells such as 20,000 feet or more. U.S. Pat. No. 4,106,565 to Britt O. Braddick discloses a packer having elastomeric sealing elements for forming a fluid barrier in an annulus formed by concentric tubing and casing strings. The packer in U.S. Pat. No. 4,106,565 is particularly adapted for use in the well sealing system of U.S. Pat. No. 3,531,236. Both U.S. Pat. Nos. 3,531,236 and 4,106,565 are incorporated by reference for all purposes in this application.

SUMMARY OF THE INVENTION

The present invention discloses a well sealing system for blocking fluid flow through an annulus partially defined by the exterior of a first tubular means and the interior of a second tubular means when the first tubular means is disposed within the second tubular means comprising a production well packer attached to the first tubular means, a plurality of packing rings carried on the exterior of the first tubular means, a metal seal ring carried on the exterior of the first tubular means, and means for compressing and radially expanding the metal seal ring to contact the interior of the second tubular means when the first tubular means is disposed therein.

One object of the present invention is to form a metal to metal seal between the exterior of a tubing string and the interior of a casing string disposed within a well bore. Multiple secondary elastomeric to metal seals are also formed to back up the primary metal to metal seal.

Another object of the present invention is to provide a plurality of backup rings to control the compression and radial expansion of the metal seal ring and to prevent undesired extrusion of the metal seal ring.

A further object of the present invention is to provide a well sealing system having metal to metal seals and elastomeric to metal seals which can all be established by lowering a tubing string into a receptacle within a casing string. The various seals are established by setting down the weight of the tubing string onto the receptacle without the need for additional tubing manipulation.

An additional object of the present invention is to provide a protective cylinder which covers elastomeric packing rings and metal seal rings carried on the exterior of the tubing string. The protective cylinder prevents damage to the packing rings while the tubing string is being lowered through the bore of a casing string. The protective cylinder is also provided to assist in setting a production well packer forming a part of the tubing string.

Other objects and advantages of the present invention will become readily apparent to those skilled in the art from reading the following description in conjunction with the drawings and the claims.

BRIEF DESCRIPTION OF THE DRAWINGS

FIG. 1C is a drawing, partially in section and partially in elevation, showing a plurality of packing rings and a metal seal ring carried on the exterior of the first tubular means.

FIG. 1D is a drawing, partially in section and partially in elevation, showing a guide sleeve slidably carried on the end of the first tubular means opposite the production well packer.

FIG. 5 is an enlarged schematic drawing, in section, of the backup rings and metal seal ring of the present invention in their compressed and radially expanded position.

FIG. 6 is an enlarged schematic drawing, in section, of the backup rings and metal seal ring of the present invention in their relaxed position.

FIG. 7 is an enlarged drawing, in section, showing the second backup ring of the present invention in its compressed position.

FIG. 8 is an enlarged drawing, in section, showing the second backup ring of the present invention in its relaxed position.

DESCRIPTION OF THE PREFERRED EMBODIMENT

Figures 1A, 1B:
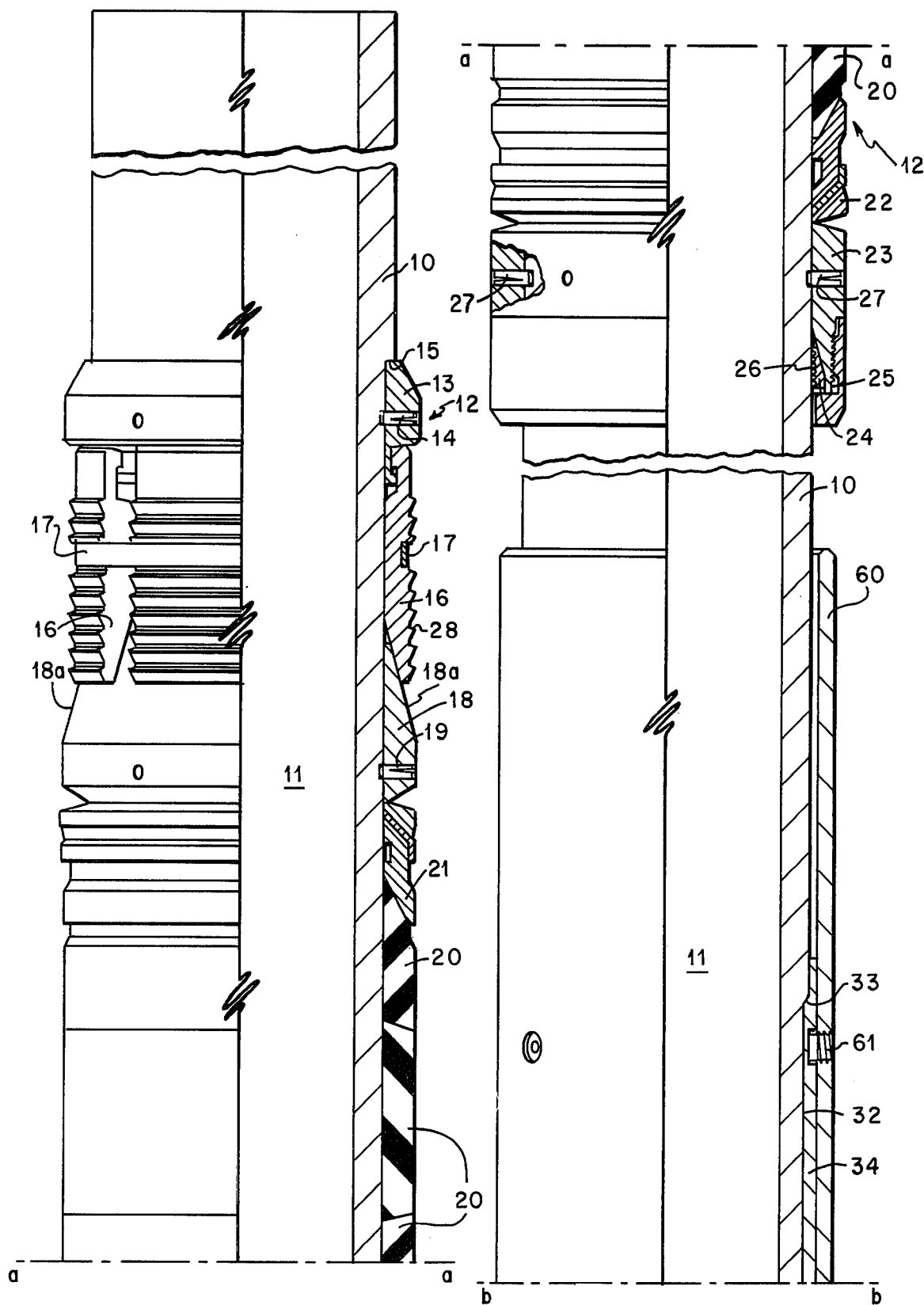
FIGS. 1A and 1B are drawings, partially in section and partially in elevation, showing a production well packer attached to a first tubular means.

Referring to the drawings and particularly to FIGS. 1A through 1D, first tubular means 10 is shown with longitudinal bore 11 therethrough. Production well packer 12 is attached to and carried on the exterior of first tubular means 10. Production well packer 12 includes slip carrier 13 which is secured around tubular means 10 by shear pin 14. Slip carrier 13 abuts shoulder 15 formed on the exterior of first tubular means 10. A plurality of slips 16 are dependent from slip carrier 13 and are held around the exterior of first mandrel means 10 by breakable band 17. Slip cone 18 is secured on the exterior of first tubular means 10 by shear pins 19 adjacent to and contacting slips 16. Slip cone 18 has surface 18a, which is sloped inwardly toward first tubular means 10 and slidably contacts a matching surface on slips 16. Slip cone 18 and slips 16 are fitted into sliding relationship such that when pin 19 is sheared slip cone 18 can slide longitudinally towards shoulder 15. Slip carrier 13 and slips 16 are prevented from moving longitudinally by shoulder 15. Thus, surface 18a cams slips 16 radially outward from first tubular means 10 as slip cone 18 moves toward shoulder 15.

Elastomeric seal elements 20 are fitted around the exterior of first tubular means. Seal elements 20 are annular members formed from resilient rubber-like material. Each element 20 may be formed from the same elastomeric material or each element 20 may have separate properties depending upon various well conditions. Seal elements 20 are confined between a first backup shoe 21 abutting slip cone 18 and a second backup shoe 22. Each backup shoe is generally a circular ring constructed from deformable material such as brass or a combination of brass and Teflon. The backup shoes are designed to expand radially and contact the inner surface of a second tubular means to prevent extrusion of seal elements 20.

Internal slip carrier 23 is carried on the exterior of first tubular means 10 adjacent to and abutting second backup shoe 22. A plurality of internal slips 24 are carried within recess 25 of internal slip carrier 23. Internal slips 24 have teeth 26 contacting the exterior of first tubular means 10. Teeth 26 are shaped to allow internal slip carrier 23 to move longitudinally towards shoulder 15 and prevent movement of slip carrier 23 longitudinally away from shoulder 15. Shear pins 27 are provided to prevent movement of internal slip carrier 23 in either direction until after pins 27 have been sheared.

Production well packer 12 can thus be engaged with the interior of a second tubular means by holding internal slip carrier 23 fixed relative to a second tubular means such as casing 82a. Force can be applied to first tubular means 10 resulting in longitudinal movement of shoulder 15 on first tubular means 10 towards internal slip carrier 23 which will radially expand slips 16 and sealing elements 20. Slips 16 have teeth 28 on their exterior to engage the interior of the second tubular means preventing movement of production well packer 12 in a direction opposite to the movement of first tubular means 10. Seal elements 20 along with first backup shoe 21 and second backup shoe 22 are compressed and radially expanded to form a fluid tight seal with the interior of the second tubular means. Internal slips 24 hold sealing elements 20 and slips 16 in their expanded position preventing movement of internal slip carrier 23 away from shoulder 15.

As best shown in FIG. 1C, a plurality of packing rings 30 care carried on the exterior of first tubular means 10 spaced longitudinally from production well packer 12. Packing rings 30 are shown as a series of chevron rings facing in opposite directions. Preferably, packing rings 30 comprise a KTR seal assembly. KTR is a registered trademark belonging to Otis Engineering Corporation, trademark registration No. 1,108,002.

Packing rings 30 are secured to the exterior of first tubular means 10 by a plurality of c-rings 31. The outside diameter 32 of first tubular means 10 adjacent to packing rings 30 is reduced as compared to the outside diameter of first tubular means 10 adjacent to production well packer 12. This transition in outside diameter results in a tapered shoulder 33 being formed between packer 12 and packing rings 30 on the exterior of first tubular means 10. Support sleeve 34 is carried on outside diameter portion 32. One end of support sleeve 34 abuts tapered shoulder 33 and the other end abuts packing rings 30. Support sleeve 34 does not move relative to first tubular means 10 while first tubular means 10 is being inserted into and engaged with the interior of the second tubular means. As will be later explained, reduced outside diameter 32 and shoulder 33 comprise a portion of the means for holding protective cylinder 60 from moving relative to first tubular means 10.

Metal seal ring 40 is carried on the exterior of first tubular means 10 spaced longitudinally from packing rings 30. Preferably, metal seal ring 40 is formed from lead. A plurality of backup ring assemblies 41 are disposed around the exterior of first tubular means 10 at both ends of metal seal ring 40. Backup ring assemblies 41 will be later described in more detail. Spacer ring 35 is secured to the exterior of first tubular means 10 between packing rings 30 and metal seal ring 40. The primary function of spacer ring 35 is to provide shoulder 36 for compression and radial expansion of metal seal ring 40. The other end 37 of spacer ring 35 provides support for packing rings 30.

For ease of manufacture and assembly, spacer ring 35 is generally cylindrical and slidable over outside diameter 32. Snap ring 38 is fitted into a recess in outside diameter 32 to properly position spacer ring 35 and metal seal ring 40. Shoulder 36 could be formed as part of the exterior of first tubular means 10 if desired.

Protective cylinder 60 is releasably secured to support sleeve 34 by shear screw 61. As previously noted, support sleeve 34 abuts tapered shoulder 33 and does not move relative to first tubular means 10 while being installed within a second tubular means. The inside diameter and length of protective sleeve 60 are selected to cover both packing rings 30 and metal seal ring 40 preventing damage thereto during installation of first tubular means 10.

Referring generally to FIG. 1D, portion 63 of first tubular means 10 has a reduced outside diameter 62 as compared to outside diameter 32. The change in outside diameter forms shoulder 64. Portion 63 is formed near end 65 of first tubular means 10 opposite production well packer 12. Guide sleeve 70 is slidably carried over end 65. Inside diameter portion 71 of guide sleeve 70 is compatible with outside diameter 32. Inside diameter portion 72 of guide sleeve 70 is compatible with outside diameter 62. The transition from inside diameter 71 to inside diameter 72 forms shoulder 73 on guide sleeve 70 facing shoulder 64 on first tubular means 10. One or more longitudinal slots 66 are cut through outside diameter 62 between shoulder 64 and end 65 of first tubular means 10. Lug 74 is secured to guide sleeve 70 and extends into an adjacent slot 66. During normal operation the length of longitudinal movement of guide sleeve 70 with respect to first tubular means 10 is defined by the length of slot 66. If lugs 74 should become damaged or sheared off, shoulder 64 abutting shoulder 73 would limit the longitudinal movement of first tubular means 10 in one direction relative to guide sleeve 70.

Metal seal ring 40 is secured on the exterior of first tubular means 10 between spacer ring 35 and guide sleeve 70. If desired, guide sleeve 70 could abut directly against one end of metal seal ring 40. However, for ease of assembly and to prevent possible misalignment while inserting first tubular means 10 into a second tubular means, sheer pin 76 is inserted through end portion 75 of guide sleeve 70 to secure guide sleeve 70 to the exterior of first tubular means 10. During compression and radial expansion of metal seal ring 40, pin 76 is sheared allowing guide sleeve 70 to transmit force to its adjacent backup ring assembly 41. End portion 75 and guide sleeve 70 are one solid piece except for the hole or holes for insertion of shear pins 76.

The length of guide sleeve 70 is selected to extend over end 65 of first tubular means 10. A portion of the end of guide sleeve 70 is cut away to form guide surface 77. Thus, guide sleeve 70 prevents any restrictions or shoulders within a second tubular means from contacting end 65 and aligns first tubular means 10 with the second tubular means. Protective cylinder 60 is slidable over the exterior of guide sleeve 70. An important feature of the present invention is that the outside diameter of protective sleeve 60 is larger than the outside diameter of guide sleeve 70. Thus, guide sleeve 70 can move longitudinally through a restriction on the inside diameter of a second tubular means while the same restriction prevents longitudinal movement of protective cylinder 60.

If desired, O-rings 78 are carried on the exterior of guide sleeve 70 to contact the inside diameter of protective cylinder 60. O-rings 78 prevent sand or other small particles from flowing past metal seal ring 40 and packing rings 30 while first tubular means 10 is being installed within a second tubular means.

Figures 2A, 2B:
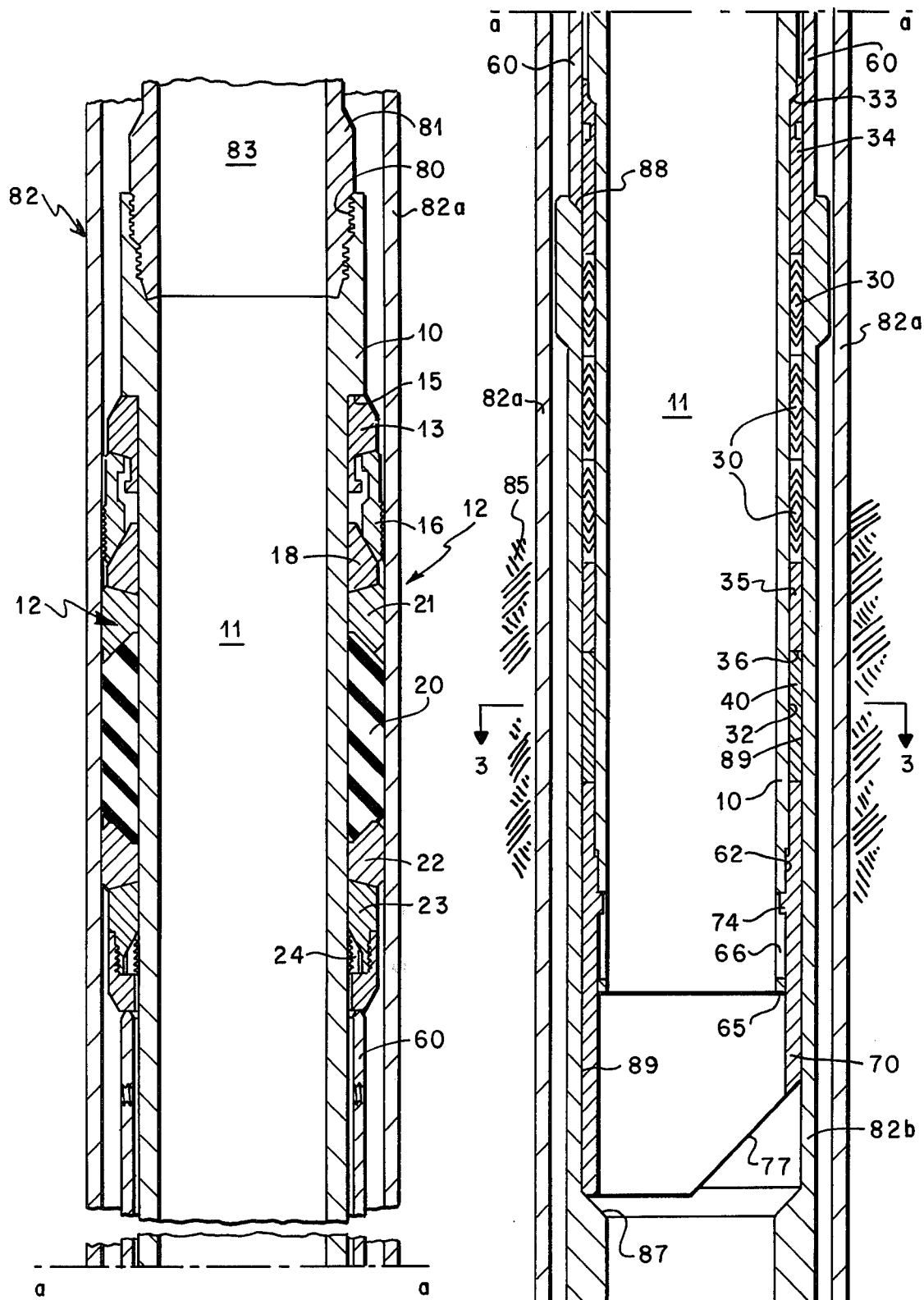
FIGS. 2A and 2B are schematic drawings, in section with portions broken away, showing a tubing string disposed within a casing string with the well sealing system of the present invention blocking fluid flow through the annulus between the tubing string and casing string.

A schematic representation of a well incorporating the well sealing system of the present invention is shown generally in FIGS. 2A and 2B. Threads 80 are shown formed on the end of first tubular means 10 near production well packer 12. Threads 80 allow first tubular means 10 to be engaged with and to comprise a portion of tubing string 81.

Tubing strings are frequently used to contain the flow of formation fluids from an underground reservoir (not shown) to the well surface (not shown). Tubing string 81 prevents formation fluids which can be highly corrosive and/or very hot from directly contacting casing string 82. A casing string generally has a layer of cement between its exterior and the inside diameter of the well bore. Therefore, the removal of a casing string is very difficult and expensive. Well sealing system of the present invention directs formation fluid flow through bore 11 of first tubular means 10 and bore 83 of tubing string 81.

The casing system shown in FIGS. 2A and 2B comprises two sections 82a and 82b. This type of casing system is more fully explained in U.S. Pat. No. 3,531,236. If desired, cement can be used to secure casing section 82b in place relative to casing section 82a. Alternatively, various liner hanger systems are well known which could be used to anchor casing section 82b within section 82a. Cement is not shown in FIG. 2B to demonstrate that the well sealing system of the present invention can form a satisfactory seal within casing 82 without cement between sections 82a and 82b.

Figure 3:
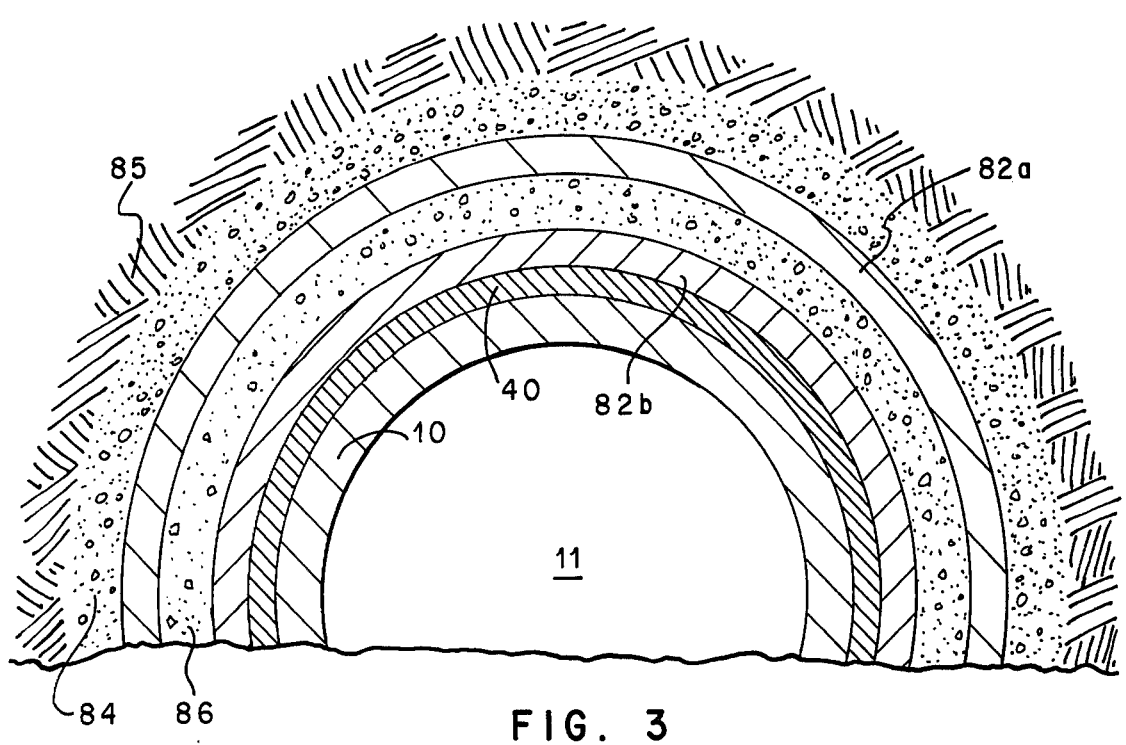
FIG. 3 is a schematic drawing showing a portion of a horizontal cross section taken along lines 3—3 of FIG. 2B.

FIG. 3 shows a typical horizontal cross section. Cement sheath 84 is disposed between the exterior of casing section 82a and earth formation 85. An additional cement sheath 86 is shown between casing section 82a and casing section 82b.

The well sealing system of the present invention can be used in any casing system which has a first restriction or shoulder 87, a second restriction or shoulder 88, and inside diameter portion 89 therebetween. Inside diameter 89 preferably has a smooth finish for forming a fluid tight seal with packing rings 30 and metal seal ring 40.

The outside diameter of guide sleeve 70 is selected to slide longitudinally past the restriction formed by second shoulder 88 and to rest on the restriction formed by first shoulder 87. The outside diameter of protective cylinder 60 is selected to engage second shoulder 88 and to rest thereon. The outside diameter of packing rings 30 can engage inside diameter 89. Preferably, the outside diameter of packing rings 30 is larger than inside diameter 89. Backup ring assemblies 41 are selected to control the compression and radial expansion of metal seal ring 40 to form a fluid tight seal between the exterior of first tubular means 10 and inside diameter 89.

As previously stated, first tubular means 10 and the sealing system carried thereon can form a fluid tight barrier with the interior of any second tubular means which has an appropriate size first shoulder equivalent to shoulder 87, second shoulder equivalent to shoulder 88 and inside diameter 89 therebetween. Also, various well-known hydraulically set packers could be substituted for production well packer 12.

Referring generally to FIGS. 5 through 8, enlarged sectional schematics of backup ring assemblies 41 and part of metal seal ring 40 are shown. A backup ring assembly 41 abuts each end of metal seal ring 40. For purposes of explanation, only backup ring assembly 41 carried on the exterior of first tubular means 10 between metal seal ring 40 and shoulder 36 is shown. An identical backup ring assembly abuts the other end of metal seal ring 40. Shoulder 36 may be formed as part of first tubular means 10 as shown in FIGS. 5 and 6 or may be a part of spacer ring 35 as shown in FIG. 1C.

The force required to compress and radially expand metal seal ring 40 is provided by sliding guide sleeve 70 longitudinally towards shoulder 36 over portion 63 of first tubular means 10. FIG. 6 shows backup ring assembly 41 in its relaxed position. Assembly 41 comprises a plurality of backup rings disposed around the exterior of first tubular means 10 between shoulder 36 and metal seal ring 40. Preferably, the backup rings are selected to have a hardness greater than metal seal ring 40. Tapered ramp 91 is formed on the side of first backup ring 92 immediately adjacent to metal seal ring 40. Each end of metal seal ring 40 has surface 93 formed thereon. The angle of surface 93 is preferably supplementary to the angle of tapered ramp 91. The other side of first backup ring 92 is generally normal to the exterior of first tubular means 10 and contacts a matching, normal surface 94 on second backup ring 95. Convex surface 96 is formed on second backup ring 95 opposite normal surface 94. Third backup ring 97 has a concave surface 98 facing convex surface 96. Opposite concave surface 98, third backup ring 97 has a convex surface 99 facing fourth backup ring 100. Concave surface 101 on fourth backup ring 100 faces convex surface 99 on third backup ring 97. Fourth backup ring 100 abuts shoulder 36. Note that the fourth backup ring 100 of assembly 41 on the other end of metal seal ring 40 abuts guide sleeve 70. Second backup ring 95 preferably has diagonal split 102 therethrough. As best shown in FIGS. 7 and 8, split 102 allows the ends of second backup ring 95 to move relative to each other. Thus, the outside diameter of second backup ring 95 will increase and expand as backup ring seal assembly 41 is compressed. When second backup ring 95 is relaxed as shown in FIG. 8, its outside diameter is less than its outside diameter when backup ring 95 is compressed as shown in FIG. 7. Diagonal split 102 allows radial expansion of backup ring 95 without forming a gap between the ends of backup ring 95.

Figure 4:
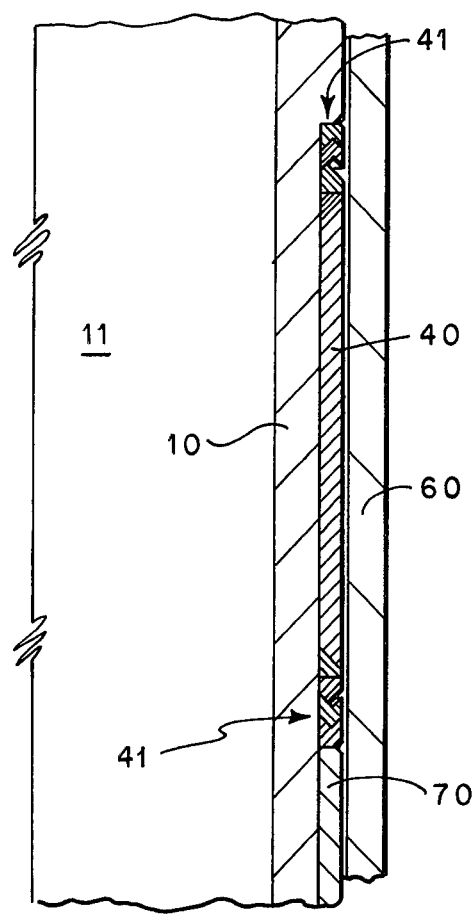
FIG. 4 is a schematic drawing showing the metal seal ring of the present invention in its relaxed position between the exterior of a first tubular means and covered by a protective cylinder means.

Preferably, the radii of the concave surfaces of backup ring assembly 41 are smaller than the radii of the convex surfaces. Referring specifically to concave surface 101, curve 101a is formed between two essentially flat surfaces 101b and 101c. If surface 101b and 101c were extended, they would intersect at essentially an angle of 76°. Each concave surface preferably forms an acute angle. FIG. 4 shows the convex surfaces of seal assembly 41 as being right angles. A right angle would be formed by extending the sides of surfaces 96 and 99. When seal ring assembly 41 is relaxed, the appex of the imaginary angles are offset from each other as best shown in FIG. 6.

When shoulder 36 moves towards guide sleeve 70, metal seal ring 40 is compressed between tapered ramps 91. Metal seal ring 40 is formed from a metal such as lead which can be readily deformed to contact both outside diameter 32 of first tubular means 10 and inside diameter 89 of second tubular means 82b.

Since the curvature (or acute angle) of surface 101 is offset from surface 99, side 101c of fourth backup ring 100 will cam third backup ring 97 inwardly toward outside diameter 32. Surface 99 will also tend to deform side 101c such that a portion of fourth backup ring 100 may actually contact inside diameter 89 as shown in FIG. 5. Thus, fourth backup ring 100 and its concave surface 101 cooperate with convex surface 99 tending to secure third backup ring 97 against first tubular means 10.

With third backup ring 97 secured, surfaces 98 and 96 cooperate to project second backup ring 95 radially outward until it firmly contacts inside diameter 89. Slit 102 allows radial expansion of second backup ring 95. Thus, a portion of normal surface 94 on second backup ring 95 forms a barrier preventing undesired extrusion of metal seal ring 40 as it is compressed and radially expanded.

Backup ring assembly 41 on the other end of metal seal ring 40 functions in the same manner as described above.

OPERATING SEQUENCE

Casing string 82 with an appropriately sized first restriction or shoulder 87, second restriction or shoulder 88 and sealing surface or inside diameter 89 therebetween is cemented within a well bore by conventional techniques. First tubular means 10 carrying the sealing system of the present invention is attached to tubing string 81 by threads 80 at the well surface (not shown) and lowered by conventional equipment (not shown) through the bore of casing 82 until guide sleeve 70 contacts first shoulder 87. Protective cylinder 60 prevents damage to packing rings 30 and metal seal ring 40 during the lowering sequence. Guide surface 77 on the end of guide sleeve 70 assists in directing tubing string 81 and first tubular means 10 past any restrictions such as second shoulder 88 within the bore of casing 82. As previously noted, the outside diameter of guide sleeve 70 is selected to slide past second shoulder 88 but not first shoulder 87.

After guide sleeve 70 moves past second shoulder 88, protective cylinder 60 will contact shoulder 88 preventing further movement of protective cylinder 60. As tubing string 81 continues to be lowered, force will be applied to screw 61 until it shears allowing first tubular means 10 to slide relative to protective cylinder 60. The weight of tubing string 81 is applied to shear screw 61 by tapered shoulder 33 acting upon support sleeve 34.

Further movement of mandrel means 10 exposes packing rings 30 and metal seal ring 40 to inside diameter 89 of second tubular means 82b.

When guide sleeve 70 is resting upon first shoulder 87, lug 74 and slot 66 cooperate to allow limited longitudinal movement of first tubular means 10 with respect to guide sleeve 70. This continued movement caused by setting down the weight of tubing string 81 on shoulder 87 results in compression and radial expansion of metal seal ring 40 between shoulder 36 and guide sleeve 70 as previously described.

The length of protective cylinder 60 and the location of shoulder 15 on first tubular means 10 are preferably selected such that internal slip carrier 23 will contact protective cylinder 60 as metal seal ring 40 starts to be compressed. Thus, as tubing string 81 is lowered to compress and radially expand metal seal ring 40, this same movement causes production well packer 12 to engage and form a fluid tight seal with the interior of casing 82a by shoulder 15 moving towards protective cylinder 60.

The present invention provides three separate seals between the exterior of first tubular means 10 and the interior of second tubular means 82. The seals are metal seal ring 40, packing rings 30 and seal element 20. The later two seals are secondary elastomeric to metal seals backing up the primary metal to metal seal of seal ring 40.

The previous description is illustrative of only one embodiment of the present invention. Other variations, such as substituting a hydraulically set packer for compression set packer 12, will be readily apparent to those skilled in the art after reading the above description in conjunction with the drawings and claims. Such variations and modifications are within the scope of the invention which is defined by the claims.

What is claimed is:

1. A well sealing system for blocking fluid flow through an annulus partially defined by the exterior of a first tubular means and the interior of a second tubular means when the first tubular means is disposed within the second tubular means, comprising:
  a. a production well packer attached near one end of the first tubular means and engageable with the interior of the second tubular means;
  b. a plurality of packing rings carried on the exterior of the first tubular means and engageable with the interior of the second tubular means;
  c. a metal seal ring carried on the exterior of the first tubular means;
  d. means for compressing and radially expanding the metal seal ring to contact the interior of the second tubular means when the first tubular means is disposed therein;
  e. the means for compressing and radially expanding the metal seal ring comprising a guide sleeve slidably carried over the other end of the first tubular means;
  f. a shoulder on the exterior of the first tubular means and the metal seal ring disposed between the guide sleeve and the shoulder; and
  g. the outside diameter of the guide sleeve sized to engage a first restriction within the second tubular member preventing longitudinal movement of the guide sleeve therethrough and compressing the metal seal ring between the shoulder and the guide sleeve.

2. A well sealing system as defined in claim 1 wherein the first tubular means comprises a portion of a tubing string and the second tubular means comprises a portion of a casing string.

3. A well sealing system as defined in claim 1 wherein the metal seal ring comprises lead.

4. A well sealing system, as defined in claim 1, further comprising:
   a. a plurality of backup rings disposed around the exterior of the first tubular means between both the guide sleeve and the metal seal ring and the shoulder and the metal seal ring;
   b. the backup rings selected to have a hardness greater than the metal seal ring;
   c. a tapered ramp formed on the side of each first backup ring immediately adjacent to each end of the metal seal ring;
   d. each tapered ramp engaging a matching surface at its respective end of the metal seal ring;
   e. the other side of each first backup ring being generally normal to the exterior of the first tubular means and contacting a matching surface on each second backup ring adjacent thereto;
   f. each second backup ring having a convex surface opposite its normal surface;
   g. the convex surface of each second backup ring engaging a concave surface on each third backup ring adjacent thereto;
   h. each third backup ring having a convex surface opposite its concave surface;
   i. a concave surface on each fourth backup ring facing the convex surface of each adjacent third backup ring and a surface on each fourth backup ring normal to the exterior of the first tubular means;
   j. the normal surface of one fourth backup ring abutting the shoulder and the normal surface of the other fourth backup ring abutting the guide sleeve; and
   k. each second backup ring split allowing the second backup ring to expand radially when compressed between the concave surface of its adjacent third backup ring and the normal surface of its adjacent first backup ring.

5. A well sealing system, as defined in claim 4, wherein the shoulder comprises the end of a spacer ring carried on the exterior of the first tubular means between the packing rings and the metal to metal seal ring.

6. A well sealing system, as defined in claim 1, further comprising:
   a. a protective cylinder releasably secured to the exterior of the first tubular means and surrounding the packing rings to protect the packing rings prior to inserting the first tubular means within the second tubular means; and
   b. the outside diameter of the protective cylinder sized to engage a second restriction within the second tubular means allowing release of the protective cylinder and exposure of the packing rings to the interior of the second tubular means between the first and second restrictions.

7. A well sealing system, as defined in claim 6, wherein means for engaging the production well packer with the interior of the second tubular means include the protective cylinder abutting the second restriction.

8. A well sealing system, as defined in claim 7, further comprising:
   a. the packing rings formed from elastomeric material; and
   b. the outside diameter of the packing rings larger than the inside diameter of the second tubular means between its first restriction and its second restriction.

9. Apparatus for forming a metal to metal seal between a first tubular means longitudinally slidable within a second tubular means, comprising:
   a. a metal seal ring carried on the exterior of the first tubular means;
   b. a guide sleeve slidably carried over one end of the first tubular means;
   c. a shoulder secured to the exterior of the first tubular means and the metal seal ring disposed between the guide sleeve and the shoulder;
   d. the outside diameter of the guide sleeve sized to engage a first restriction within the second tubular means restricting longitudinal movement of the guide sleeve and allowing the first tubular means to slide relative to the guide sleeve;
   e. a plurality of backup rings disposed around the exterior of the first tubular means between the guide sleeve and one end of the metal seal ring and the shoulder and the other end of the metal seal ring; and
   f. means, including the backup rings, for compressing and radially expanding the metal seal ring when the first tubular means slides relative to the guide sleeve.

10. Apparatus for forming a metal to metal seal, as defined in claim 9, further comprising:
    a. the outside diameter of the metal seal ring, when relaxed, less than the inside diameter of the second tubular means immediately adjacent to the first restriction; and
    b. the backup rings having a hardness greater than the metal seal ring.

11. Apparatus for forming a metal to metal seal, as defined in claim 10, wherein the backup rings further comprise:
    a. a first backup ring, immediately adjacent to each end of the metal seal ring, having a tapered ramp on one side engaging a matching surface on each end of the metal seal ring;
    b. each first backup ring having a surface generally normal to the exterior of the first tubular means on the side opposite the tapered ramp;
    c. a second backup ring having a generally normal surface abutting the generally normal surface of each first backup ring;
    d. each second backup ring having a convex surface on the side opposite its generally normal surface;
    e. a third backup ring having a concave surface sized to engage the adjacent convex surface of the second backup ring as the metal seal ring is compressed;
    f. a convex surface on each third backup ring opposite its concave surface;
    g. a fourth backup ring having a concave surface sized to engage the convex surface of the adjacent third backup ring as the metal seal ring is compressed;
    h. each fourth backup ring having a generally normal surface opposite its concave surface;
    i. the normal surface of one backup ring abutting the shoulder and the normal surface of the other backup ring abutting the guide sleeve; and
    j. a diagonal split in each second backup ring allowing radial expansion thereof as the metal seal ring is compressed.

12. Apparatus for forming a metal to metal seal, as defined in claim 11, with the metal seal ring disposed between the tapered ramps of each first backup ring and radially expanded by the first tubular means moving the shoulder longitudinally towards the guide sleeve.

13. Apparatus for forming a metal to metal seal, as defined in claim 12, with the adjacent concave and convex surfaces of the backup rings longitudinally and radially offset from each other when the metal seal ring is relaxed.

14. Apparatus for forming a metal to metal seal, as defined in claim 9, wherein the metal seal ring comprises lead.

15. A well sealing system for blocking fluid communication through an annulus formed by disposing a tubing string within a casing string, comprising:
 a. the casing string having a first shoulder projecting into the bore of the casing string;
 b. a second shoulder projecting into the bore of the casing string and spaced above the first shoulder;
 c. the inside diameter of the casing string between the first and second shoulders having a smooth surface for sealing with elastomeric material;
 d. a guide sleeve slidably carried on the end of the tubing string;
 e. the outside diameter of the guide sleeve selected to engage the first shoulder of the casing string restricting movement of the guide sleeve through the bore of the casing string;
 f. a spacer ring secured to the exterior of the tubing string and spaced above the guide sleeve;
 g. a metal seal ring carried on the exterior of the tubing string between the guide sleeve and the spacer ring;
 h. means for compressing and radially expanding the metal seal ring comprising the guide sleeve and the spacer ring;
 i. a plurality of packing rings carried on the exterior of the tubing string above the spacer ring;
 j. the outside diameter of the packing rings selected to engage the inside diameter of the casing string between the first and second shoulders;
 k. a protective cylinder releasably secured to the exterior of the tubing string having a first position covering the packing rings and a second position allowing the packing rings to engage the inside diameter of the casing string; and
 l. the outside diameter of the protective sleeve selected to engage the second shoulder and shift the protective sleeve from its first position to its second position.

16. A well sealing system, as defined in claim 15, further comprising:
 a. a production well packer carried by the tubing string above the packing rings; and
 b. the packer abutting the protective cylinder when the cylinder is in its second position.

17. A well sealing system, as defined in claim 16, further comprising:
 a. a plurality of backup rings disposed around the exterior of the tubing string between both the guide sleeve and the metal seal ring and the spacer ring and the metal seal ring;
 b. the backup rings selected to have a hardness greater than the metal seal ring;
 c. a tapered ramp formed on the side of each first backup ring immediately adjacent to each end of the metal seal ring;
 d. each tapered ramp engaging a matching surface at its respective end of the metal seal ring;
 e. the other side of each first backup ring being generally normal to the exterior of the tubing string and contacting a matching surface on each second backup ring adjacent thereto;
 f. each second backup ring having a convex surface opposite its normal surface;
 g. the convex surface of each second backup ring engaging a concave surface on each third backup ring adjacent thereto;
 h. each third backup ring having a convex surface opposite its concave surface;
 i. fourth backup rings having a concave surface facing the convex surface of each third backup ring and a surface normal to the exterior of the tubing string;
 j. the normal surface of one fourth backup ring abutting the spacer ring and the normal surface of the other fourth backup ring abutting the guide sleeve; and
 k. each second backup ring having a split allowing the second backup ring to expand radially when compressed between the concave surface of its adjacent third backup ring and the normal surface of its adjacent first backup ring.

* * * * *